United States Patent [19]
Korenjak et al.

[11] Patent Number: 5,860,892
[45] Date of Patent: Jan. 19, 1999

[54] CLUTCH FOR A MOTORCYCLE

[75] Inventors: Norbert Korenjak, Stadl-Paura; Claus Holweg, Murau, both of Austria

[73] Assignee: Bombardier-Rotax Gesellschaft m.b.H., Gunskirchen, Austria

[21] Appl. No.: 766,437

[22] Filed: Dec. 12, 1996

[30]     Foreign Application Priority Data

Dec. 22, 1995 [AT] Austria ................................. 2092/95

[51] Int. Cl.⁶ ................................................. B60K 41/02
[52] U.S. Cl. ............................................................ 477/180
[58] Field of Search ............................ 477/86, 88, 166, 477/180; 192/83, 85 V, 91 A

[56]             References Cited

U.S. PATENT DOCUMENTS

| 4,086,992 | 5/1978 | Hamada et al. .......................... 477/88 |
| 4,091,902 | 5/1978 | Hamada .................................... 477/86 |
| 4,971,183 | 11/1990 | Tellert ...................................... 477/86 |
| 5,176,234 | 1/1993 | Reik et al. . |
| 5,469,946 | 11/1995 | Nguyen .................................... 477/86 |

FOREIGN PATENT DOCUMENTS

WO92/13208   8/1992   WIPO .

*Primary Examiner*—Dirk Wright
*Attorney, Agent, or Firm*—Collard & Roe, P.C.

[57]                ABSTRACT

A clutch (1) for a motorcycle, having intermeshing plates (9, 10) associated with an inner and outer cage (22 and 23, respectively), and having a release actuator (3) for a pusher element (5) loaded by at least one clutch spring (8) for applying pressure on the plates (9, 10). The pusher element (5) is operable by a force opposite to the closing force of the clutch spring (8) in dependence on the engine load via a control means (11).

6 Claims, 3 Drawing Sheets

CLUTCH FOR A MOTORCYCLE

This invention relates to a clutch for a motorcycle comprising intermeshing plates associated to an inner and an outer cage, and comprising a release means for a pusher element loaded by at least one clutch spring for applying pressure on the plates.

Since clutches in general have a constant slipping moment, which depends on the largest torque to be transmitted, difficulties are created in particular in the case of higher-performance motorcycles under partial load and during deceleration, because with decreasing engine torque the clutch increasingly represents a rigid drive connection between engine and driven rear wheel with the consequence that the rear wheel tends to break away and bounce. In these cases, the road adhesion of the rear wheel is no longer sufficient to enforce a uniform run of the engine via the rear wheel, so that jerks and irregularities on the part of the engine can be transmitted to the rear wheel undamped. To eliminate these disadvantages during deceleration, i.e. when the motorcycle is being braked by means of the engine, it has already been suggested to provide the clutch with a freewheel device, which during deceleration releases part of the intermeshing clutch plates, which results in a corresponding reduction of the slipping moment. Another possibility of decreasing the slipping moment of the clutch during deceleration consists in effecting a clutch adjustment in the sense of a relief of the clutch plates by means of cams provided on a tab. In both embodiments, however, the reduction of the slipping moment of the clutch only becomes effective during deceleration, namely to a predetermined, uncontrollable extent. In addition, the proposed solutions are comparatively expensive.

It is therefore the object of the invention to eliminate these deficiencies and improve a clutch as described above with simple means, so that the torque transmission between engine and driven rear wheel allows an advantageous compensation of any irregularities on the side of the drive.

This object is solved by the invention in that the pusher element can be operated via a control means in dependence on the engine load with a force opposite to the closing force of the clutch spring.

By applying a force opposite to the closing force on the pusher element, the clutch force acting on the plates can be correspondingly reduced with respect to the maximum closing force applied by the clutch spring or clutch springs, so that even under partial load or during deceleration, the clutch moment can be reduced in dependence on the respective operating conditions, so that irregularities on the part of the engine, which affect the driving properties of the motorcycle, can be compensated by means of a slip of the clutch. For this purpose, the application of a force opposite to the closing force on the pusher member is controlled by means of a control means in dependence on the engine load.

The possible influence on the clutch force also provides the opportunity for additionally controlling the clutch moment in dependence on an operating parameter, for instance in dependence on the position of the transmission, the speed of the driven rear wheel or the engine speed, and thus for advantageously influencing the drivability of the motorcycle. For operating the pusher element, the control means merely requires these parameters as reference variables.

To obtain a simple control of the operation of the pusher element in dependence on the engine load, the control means in accordance with a further embodiment of the invention may consist of a vacuum chamber connected to an intake pipe of the engine and acting on the pusher element via a piston or a membrane. Since the vacuum in the intake pipe of the engine directly depends on the engine load, the application of the vacuum of the intake pipe on the pusher element ensures the desired dependence of the clutch force on the engine load. The vacuum in the vacuum chamber can be transmitted to the pusher element rotating along with the plates by means of a piston or a membrane by interposing a pivot bearing, where by means of the size of the piston or membrane surface the force acting on the pusher element can be adapted to the respective constructional conditions. When an additional operating parameter must be considered, a corresponding control valve may be provided between intake pipe and vacuum chamber for controlling the vacuum in the vacuum chamber.

Particularly simple constructional conditions are obtained when the housing of the clutch constitutes a vacuum chamber, which is sealed by means of a membrane connected with the pusher element via a pivot bearing, because in this case a direct application of pressure on the pusher element by means of the membrane becomes possible. Apart from this, a compact, weight-saving construction is achieved. To make the vacuum chamber easily accessible, the vacuum chamber may be formed between a housing cover and the membrane. The connection to the intake pipe of the engine is effected by means of the housing cover.

In the drawing, the subject-matter of the invention is represented by way of example, wherein.

Figure 3:
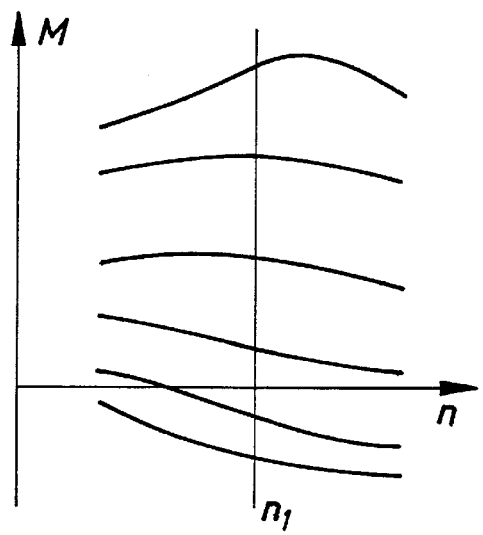
Figure 4:
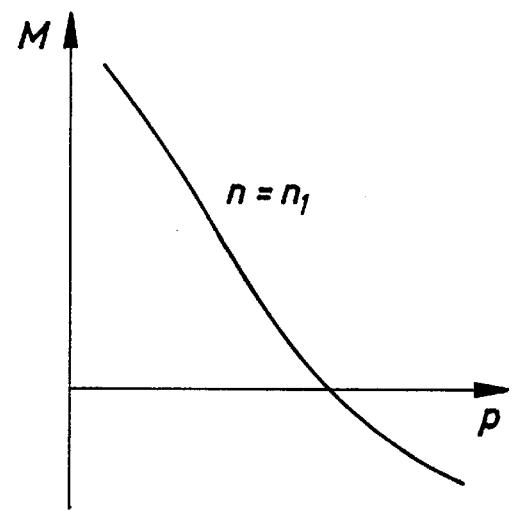
Figure 5:
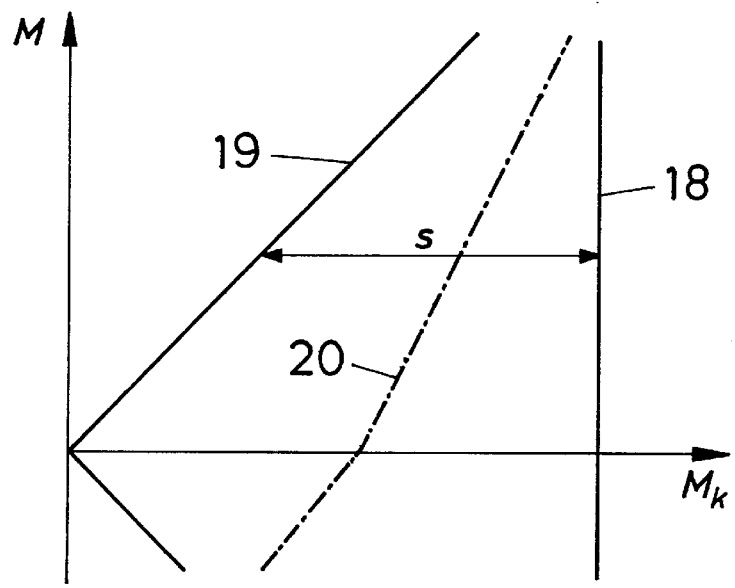

FIG. 3 shows a diagram illustrating the schematic torque band of the engine of a motorcycle with respect to the engine speed in dependence on the vacuum in the intake pipe, FIG. 4 shows a diagram indicating the relation between the torque and the intake pressure in the intake pipe at a given speed, and FIG. 5 shows a diagram reflecting the relations between the torque of the engine and the slipping moment of the clutch.

Figure 1:
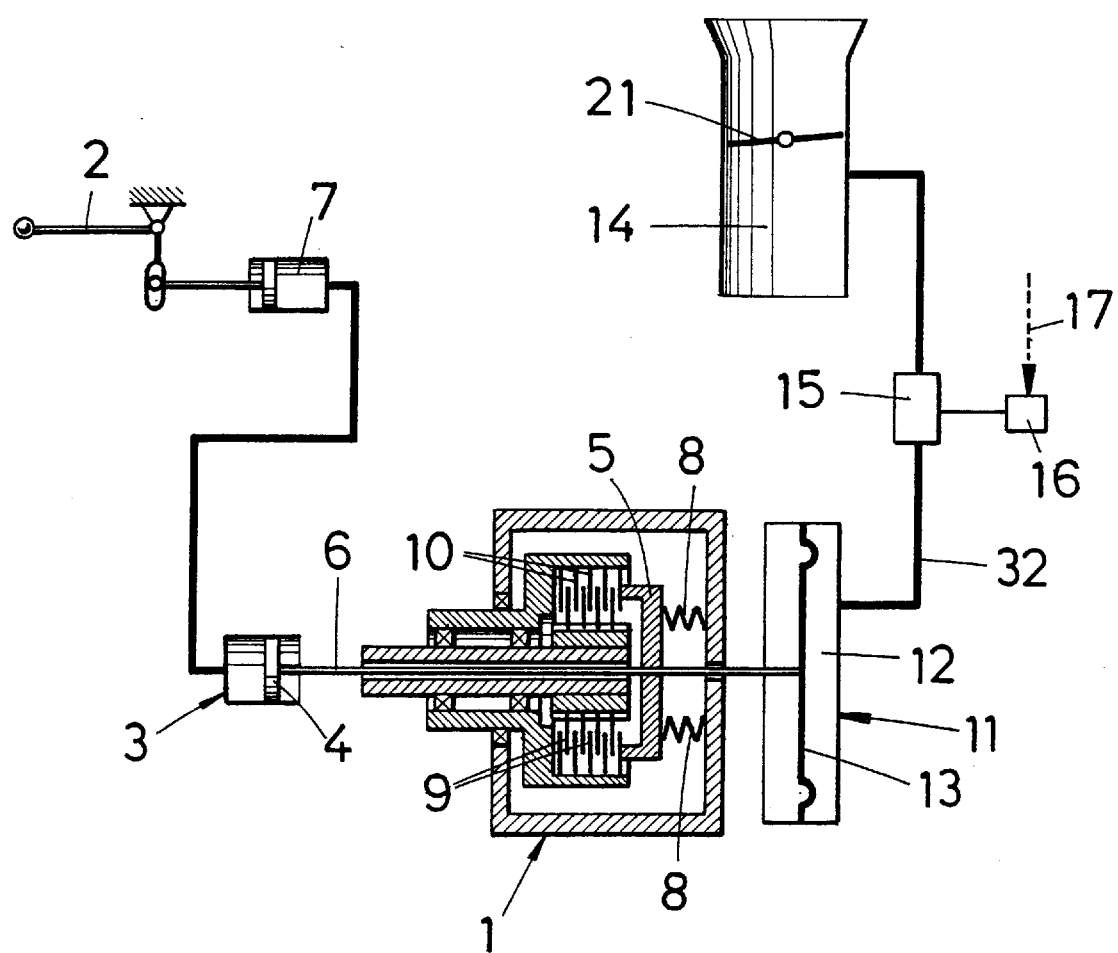
FIG. 1 shows an inventive clutch for a motorcycle in a schematic block diagram.

As can be taken from the block diagram in accordance with FIG. 1, the clutch 1 can be actuated by means of a hand lever 2 generally provided on the handlebar of the motorcycle via a release means 3, which consists of a control rod 6 movable by a piston 4 and acting on the pusher element 5 of the clutch 1. For operating the piston 4 a pneumatic cylinder 7 operable by means of the hand lever 2 is used, so that upon pulling the hand lever 2 the pusher element 5 is moved by means of the control rod 6 against the closing force of the clutch springs 8 by relieving the plates 9 and 10. When releasing the hand lever 2, the pusher element 5 is urged against the plates 9 and 10 by means of the clutch springs 8, and the clutch 1 is engaged.

The pusher element 5 is additionally operated via a control means 11 opposite to the closing force of the clutch springs 8 in dependence on the engine load. For this purpose, a vacuum chamber 12 is provided, which is sealed by means of a membrane 13 or a piston, where the membrane 13 or the piston is connected with the pusher element 5 e.g. by means of the control rod 6. This vacuum chamber 12 is connected to the intake pipe 14 of the engine, so that the pusher element 5 is relieved in dependence on the vacuum in the intake pipe 14. In addition, the vacuum in the vacuum chamber 12 can be controlled via control valve 15 in dependence on certain operating parameters. For this purpose, the actuator 16 for the control valve 15 must be operated accordingly via the control line 17.

The band of the engine torque M of an internal combustion engine depending on the speed n at various vacuums p in the intake pipe 14 is schematically represented in FIG. 3 in a set of characteristics. At a given speed $n_1$, specific vacuums p can thus be associated to the different torques M. This dependence is represented in FIG. 4, where on the abscissa the vacuum p in the intake pipe 14, and on the ordinate the torque M for the speed $n_1$ were plotted. The characteristic obtained directly shows that the vacuum p in the intake pipe 14 of the engine can be used as a measure for the engine load, in particular when the respective engine speed n is additionally considered by means of the control valve 16.

The effect of the relief of the pusher element 5 in dependence on the engine load can be illustrated by means of FIG. 5, which shows a system of coordinates on whose ordinate the torque M and on whose abscissa the clutch moment $M_k$ is indicated. The constant clutch moment resulting from the clutch springs 8 is represented by line 18. The slip limit 19 would be achieved whenever the effective clutch moment just corresponds to the effective engine torque M, taking into account the transmission ratios in the drive connection between engine and clutch. The distance s between the lines 18 and 19, which was measured in the direction of the abscissa, thus determines the safety with respect to a slipping of the clutch. The larger the engine torque M, the smaller becomes such safety. This means that under a partial load or during deceleration, which is characterized by the curves below the abscissa, the clutch increasingly represents a rigid connection, which may lead to difficulties as regards the drivability, because irregularities on the part of the engine cannot be compensated by the clutch. Such irregularities are observed in short-term torque loads of the clutch, so that then a compensation of these irregularities can be achieved when the slip limit is decreased accordingly, and thus the safety s with respect to slipping is reduced. This is achieved by the additional operation of the pusher element 5 opposite to the clutch springs 8. A linear decrease of the slip limit by means of the torque is illustrated in FIG. 5 by line 20, whose course can be adapted to the respective requirements by means of the control valve 15.

Since with respect to the mode of function it is not important by what means the operation of the pusher element 5 opposite to the clutch springs 8 is achieved, this operation can also be achieved in very different ways, for instance by means of a corresponding operation of the piston 4 or an operation of the pusher element 5 with electromagnetic forces, which are controlled in dependence on the engine load and selected operating parameters. There might be used for instance the position of the throttle valve 21 in the intake pipe 14.

Figure 2:
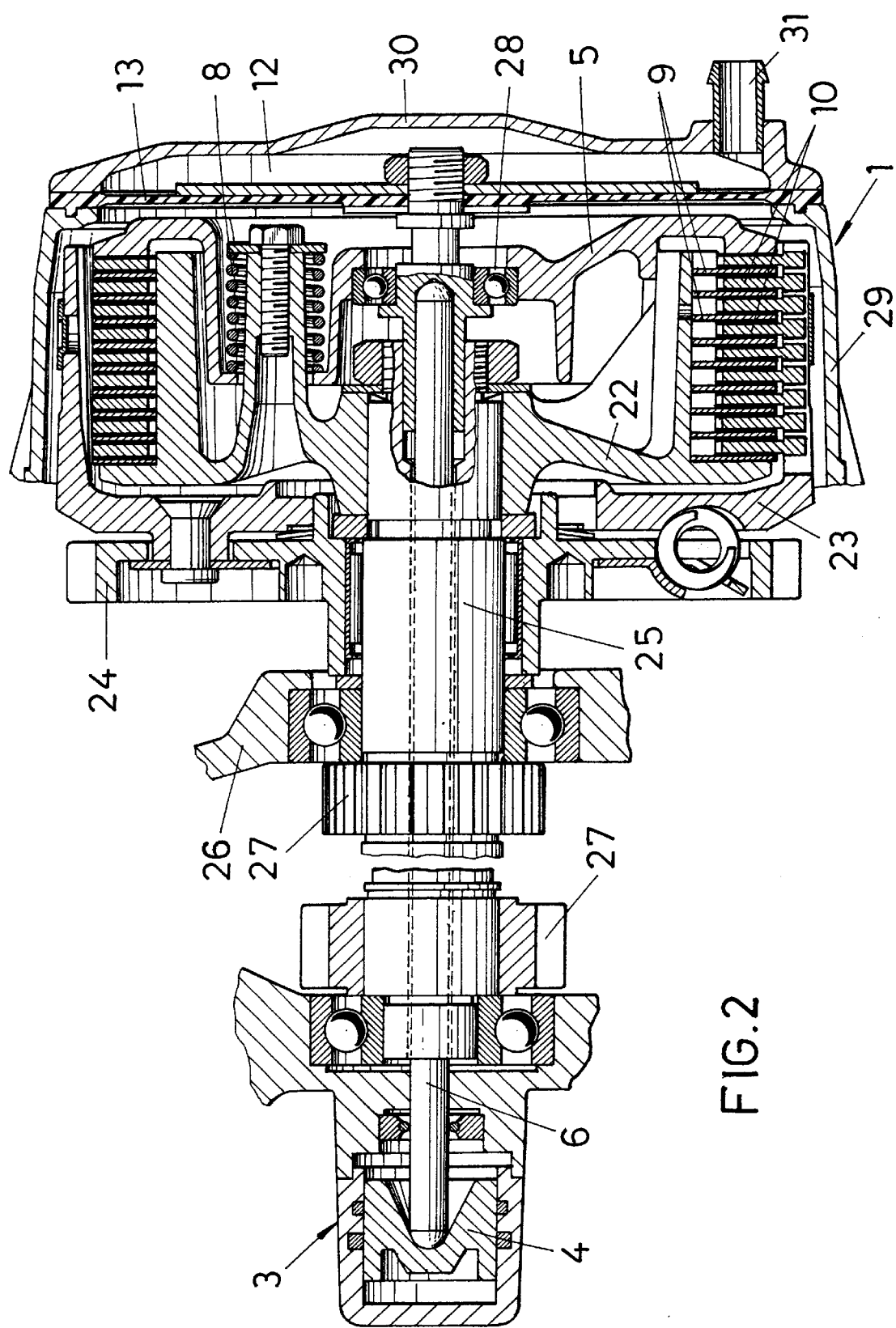
FIG. 2 shows an inventive clutch in an axial section in a larger scale.

In FIG. 2 an embodiment of an inventive clutch 1 is represented in greater detail. The intermeshing plates 9 and 10 are held in an inner cage 22 and an outer cage 23. The outer cage 23, which by means of a gearwheel 24 is meshing with a gearwheel on the crankshaft of the engine, is freely rotatably supported on a shaft 25 fixedly carrying the inner cage 22.

This shaft 25 mounted in a housing 26 is connected by the countershaft of a manual transmission, whose input gearwheels are designated with 27. Through the hollow shaft 25 there extends the control rod 6 for the pusher element 5, so that upon operating the piston 4 of the release means 3 the pusher element 5 can be lifted from the plates 9 and 10 as usual via a pivot bearing 28 against the force of the clutch springs 8. When relieving the piston 4, the clutch 1 is engaged again by means of the clutch springs 8.

In contrast to conventional clutches of this type, the clutch housing 29 constitutes at its front end a vacuum chamber 12 sealed by a membrane 13, namely inside a housing cover 30, which has a connection 31 for a vacuum line 32 to the intake pipe 14, as this is represented in FIG. 1. Since the membrane 13 is fixedly connected with the pusher element 5 via the pivot bearing 28, the pusher element 5 is operated opposite to the closing force of the clutch springs 8 in dependence on the engine load, which is connected with a corresponding decrease of the slip limit, as has already been explained in detail.

We claim:

1. A clutch for a motorcycle, comprising:
   (a) intermeshing plates respectively associated with an inner cage and an outer cage,
   (b) a release means for a pusher element loaded by at least one clutch spring applying a closing force on the plates to engage the plates and transmit an engine torque as a function of an engine load, and
   (c) a control means for operating the pusher element when the plates are engaged in dependence on the engine load with a force opposite to the closing force of the clutch spring.

2. The clutch as claimed in claim 1, wherein the force for operating the pusher element can additionally be controlled in dependence on an operating parameter.

3. The clutch as claimed in claim 1, wherein the control means consists of a vacuum chamber connected to an intake pipe of an engine and acting on the pusher element by a membrane.

4. The clutch as claimed in claim 3, wherein a control valve is arranged between the intake pipe and the vacuum chamber.

5. The clutch as claimed in claim 1, wherein a housing for the clutch defines a vacuum chamber, and comprising a membrane sealing the vacuum chamber, the membrane being connected to the pusher element by a pivot bearing.

6. The clutch as claimed in claim 5, wherein the vacuum chamber is defined between a housing cover and the membrane.

* * * * *